United States Patent [19]

Lutgendorf

[11] Patent Number: 4,934,510
[45] Date of Patent: Jun. 19, 1990

[54] DEVICE FOR SPACING BOTTLES

[75] Inventor: Pieter H. Lutgendorf, HS Deventer, Netherlands

[73] Assignee: Thomassen & Drijver-Verblifa N.V., Netherlands

[21] Appl. No.: 725,677

[22] Filed: Apr. 22, 1985

[30] Foreign Application Priority Data

Apr. 27, 1984 [NL] Netherlands .................. 8401352
Sep. 4, 1984 [NL] Netherlands .................. 8402700

[51] Int. Cl.⁵ .................................. B65G 47/31
[52] U.S. Cl. .................................. 198/461; 198/626; 198/500; 198/579; 198/626.1
[58] Field of Search ............... 198/461, 579, 626, 623, 198/500

[56] References Cited

U.S. PATENT DOCUMENTS

| Re. 28,947 | 8/1976 | Bowman | 198/626 |
| 2,304,571 | 12/1942 | Joa | 198/500 |
| 3,108,682 | 10/1963 | Zipper | 198/626 |
| 3,315,789 | 4/1967 | Egles | 198/626 |
| 3,624,773 | 11/1971 | Krooss | 198/626 |
| 3,722,657 | 3/1973 | Kienle et al. | 198/626 |
| 3,738,260 | 6/1973 | Navi et al. | 198/626 |
| 3,880,274 | 4/1975 | Bechtloff et al. | 198/626 |
| 3,978,969 | 9/1976 | Williams et al. | 198/461 |
| 4,146,124 | 3/1979 | Krooss | 198/626 |
| 4,364,466 | 12/1982 | Mojden | 198/461 |

FOREIGN PATENT DOCUMENTS

| 925458 | 5/1973 | Canada | 198/626 |
| 1208289 | 1/1966 | Fed. Rep. of Germany | 198/626 |
| 1917715 | 10/1970 | Fed. Rep. of Germany | 198/626 |
| 2204635 | 8/1973 | Fed. Rep. of Germany | 198/461 |
| 3235632 | 3/1984 | Fed. Rep. of Germany | 198/461 |
| 8102567 | 9/1981 | Int'l Pat. Institute | 198/626 |

Primary Examiner—David A. Bucci
Assistant Examiner—D. Glenn Dayoan
Attorney, Agent, or Firm—Watson, Cole, Grindle & Watson

[57] ABSTRACT

A supply conveyor has a support surface for conveying glass bottles supported at their bottoms in upright condition and feed them sequentially to a gap between the supply conveyor and a delivery conveyor, also having a support surface for conveying the bottles supported at their bottoms in upright condition and feeding them away from the gap. An intermediate conveyor accelerates the bottles across the gap from the slower speed of the supply conveyor to the high speed of the delivery conveyor and deposits them on the delivery conveyor at the requisite high speed an in upright condition and, as well, cause the bottles to be deposited on the delivery conveyor in properly spaced relation to allow the requisite inspection of the bottles to be made.

17 Claims, 2 Drawing Sheets

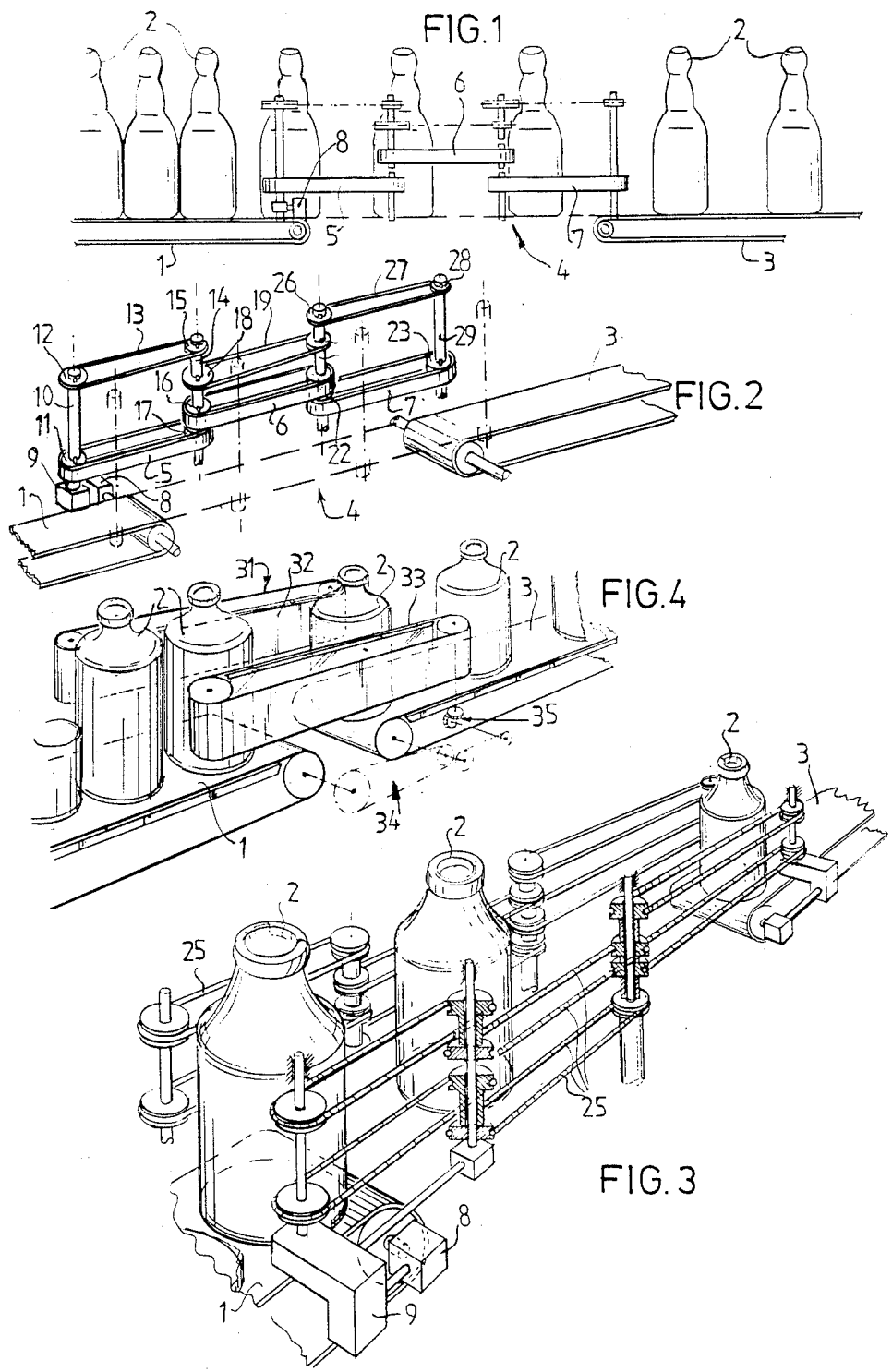

DEVICE FOR SPACING BOTTLES

BACKGROUND AND SUMMARY OF THE INVENTION

The invention relates to bottle inspecting assemblies wherein a supply conveyor means supplies a sequence of upright glass bottles at a first linear speed in relatively crowded positions thereon to an intermediate conveyor means which grips the opposite sides of the bottles, accelerates them from the first linear speed to a much greater linear speed across a gap and deposits them on delivery conveyor means which is driven at the second linear speed so as to be in sufficiently spaced, upright positions on the delivery conveyor means to permit inspections to be made. When inspecting bottles they should pass at sufficient intervals in order to permit the inspection means to observe the bottles at all sides. Inspection of bottles should preferably occur with great speed. This involves the problem that bottles manipulated with high speed and subjected to considerable acceleration tend to fall over.

The invention has for its object to provide a device for manipulating bottles with high speed while maintaining the bottles upright.

The indicated and other features of the invention will be illucidated in the following description with reference to a drawing.

BRIEF DESCRIPTION OF THE DRAWINGS

FIG. 1 a simplified scematic elevation of a device according to the invention,

FIG. 2 is a scematic perspective view of the device of FIG. 1,

FIG. 3 a perspective view of a second embodiment of the invention,

FIG. 4 a perspective view of a third embodiment of the invention,

DETAILED DESCRIPTION OF THE INVENTION

Figure 5:
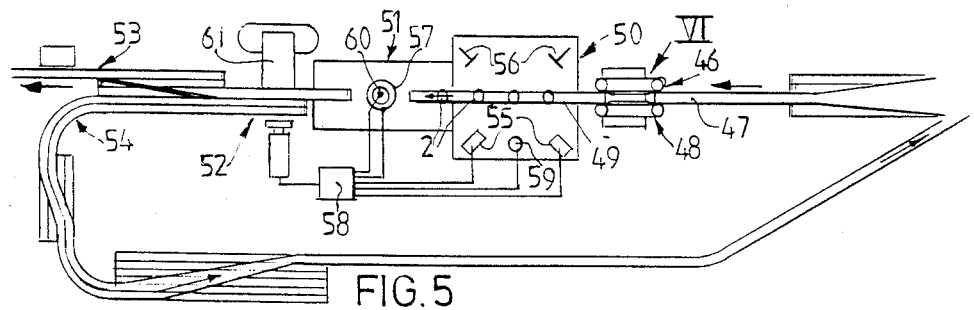
FIG. 5 a scematic plan view of a fourth device considerably further developped according the present invention, FIG. 6 on large scale a scematic perspective view of detail VI of the device of FIG. 5, and FIG. 7 on large scale a perspective section along line VII—VII of FIG. 6.

FIG. 1 shows a supply conveyor 1, on which bottles 2 positioned side by side are supplied with predetermined speed. At the right side a delivery conveyor 3 is provided delivering bottles 2 with higher speed, such that these bottles 2 have greater intervals. Between the supply conveyor 1 and the delivery conveyor 3 an intermediate conveyor 4 is provided having three sets of driven belts 5, 6 and 7 respectively is. These belts are driven by the drive motor 8 of the supply conveyor 1.

FIG. 2 shows the latter aspect particularly more in detail. The motor 8 drives for rotation a shaft 10 through a transmission 9. This shaft 10 supports a pulley 11 constituting the driving pulley for the belt 5. Further the shaft 10 supports a driven wheel 12, guiding a rope 13 running at its other end over a wheel 15 coupled with a shaft 14. This wheel 15 also drives the shaft 14 which by supporting a pulley 16 guiding the belt 6 also drives the belt 6. Further the shaft 14 supports a free wheeling pulley 17 serving as a guide pulley for the belts 5.

The wheels 12 and 15 have such diameter rate that the belts 5 and 6 have correspondingly reversed proportional linear speeds. Further the shaft 14 supports a wheel 18 co-operating with a rope 19 which at its other end is guided around a wheel 21 mounted on a shaft 20, so driving said shaft 20. The shaft 20 further supports a pulley 22 for driving a belt 7 which adjacent said delivery conveyor 3 is guided around a freewheeling pulley 23.

Due to the use of the sets of belts 5, 6, 7 only one of each set being shown in FIGS. 1 and 2 for clarification the bottles are prevented from falling over. The speed of the operating run of the supply conveyor 1 and the speed of the belts 5 may vary stepwise. The chance of the bottles 2 falling over a little, due to the fact that the bottles are supported at their sides. During taking over the bottles 2 from the belts 7 by the delivery conveyor 3 a smooth transfer is required. To this aim the speed of the belts 7 equals the speed of the delivery conveyor 3.

The shaft 20 supports a wheel 21 for driving a belt 27 guided at its other end over a wheel 28 mounted on a shaft 29 co-operating with the face wheeling pulley 23. The driven shaft 29 drives through means (not shown) the delivery conveyor 3.

FIG. 3 shows another embodiment in which bottles 2 are supported at their sides and are subjected to a speed variation by the belts 25. As an alternation of FIGS. 1 and 2 these belts have a double function e.g., conveying bottles 2 according to sets of belts 5, 6 and 7 on the one hand and driving a subsequent belt or delivery conveyor 3 respectively according to the function of the belts 13, 19, 27 on the other hand.

After the description of FIGS. 1 and 2 the operation of the device of FIG. 3 will be clear so that further description thereof is superfluous.

The supply conveyor 1 of FIG. 4 supplies round bottles 2 which are supplied to the delivery conveyor 3 through an intermediate conveyor 31. The intermediate conveyor 31 comprises two wide belts 32, 33 for supporting bottles 2 at their sides and for further conveying of these bottles 2. The delivery conveyor 3 is driven through a scematically shown transmission 34 with higher speed than the supply conveyor 1. A transmission 35 drives the belts 32. The intermediate conveyor 4 overlaps to some extent the supply conveyor 1 and the delivery conveyor 3.

During taking over of the bottles 2 from the supply conveyor 1 by the intermediate conveyor 31 some slip will occur between bottles 2 and the endless conveying elements 23. The intermediate conveyor 31 is constructed in a way that the bottles are prevented from falling over.

In this respect the device 46 of FIG. 5 is strongly preferred over the devices described herebefore. The device 46 comprises a supply conveyor 47, an intermediate conveyor 48 to be built as a separate unit adjoining a delivery conveyor 49, a side inspector 50 at the position of the delivery conveyor 49, a subsequent bottom inspector 51, an ejector 52, a selection conveyor 53 and a waste conveyor 54.

The bottles 2 mostly positioned side by side on the supply conveyor 47 which, when applying the invention, also may stand at any interval, are spaced by means of the intermediate conveyor 48 driven at considerably, e.g. 50 percent, higher speed and are transferred onto the delivery conveyor 49 driven with the same speed as the intermediate conveyor 48. The delivery conveyor 49 is incorporated in a side inspector 50 having observers 55 and lenses constructed and positioned for inspecting the bottles 2 at all sides with a capacity of the order of magnitude of 1,000, preferably 1,300 to 15,000 bottles per minute. The bottom inspector 51 is provided with an observer 57. The observers 55 and 57 are together with pulsators 59 and 60 registering each time the passing time of an observed bottle 2 through an electronic circuit 58 coupled with a control member 61 for controlling an ejector 52 in a way that—having in mind the conveying time between pulsators 59 and 60 respectively and the ejector 52—for each related bottle 2 a mechanically pushing or a blowing ejector member is excited or not for ejecting a broken or impure bottle 2 which is then discharged through said waste conveyor 48 or for letting pass a sound and clean the bottle 2 respectively.

Figure 6:
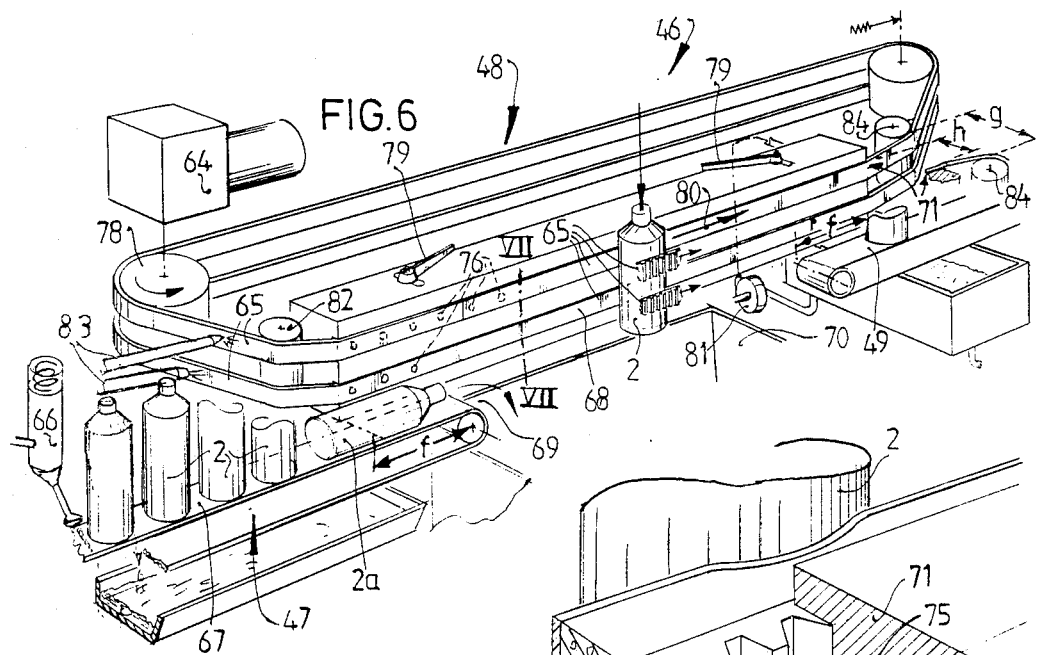

FIG. 6 shows that the intermediate conveyor 48 overlaps the supply conveyor 47 and the delivery conveyor 49 over a distance. The intermediate conveyor 48 comprises a pair of ropes 65 clamping the bottles 2 between them and driven by mechanically or electronically interconnected motors 64 with the same speed as the delivery conveyor 49. The supply conveyor 47 comprises a conveying belt 63 lubricated with liquid soap by means of a soap supplying device 66 in order to make the co-efficient of friction between the bottoms of the bottle and the support surface 67 of the supply conveyor 47 low. Bottles 2a laying on the supply conveyor 47 as well as narrow bottles 2 will enter the receiver 70, e.g. a glass container from the convey space 68 of the intermediate conveyor 48 through a fall opening 69.

Figure 7:
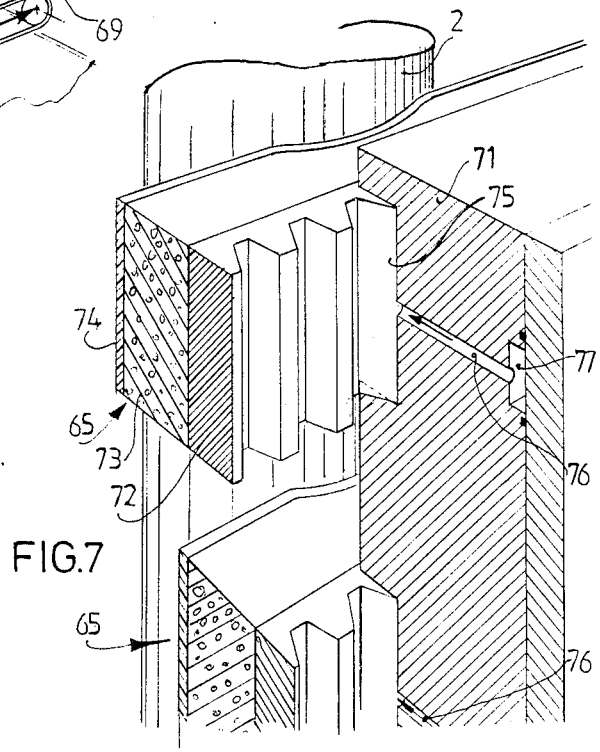

FIG. 7 shows the guide 71 of the ropes 65 each composed of a toothed belt driven by a toothed wheel 78 of a motor 64 said toothed belt 72 being provided with a layer of foam rubber 73 and an outer layer 74 of natural rubber having a high coefficient of friction with glass. The guide has for each rope 65 a groove 75 having at intervals a supply nozzle 76 for supplying lubricating water from a supply conduit 77 delivered with pressure by a pump 81. Due to this provision, the friction resistance between guide 71 and rope 65 is low.

The guides 71 are separately adjustable relatively to each other transversely to the convey direction 80 for engaging the bottles 2 symmetrically and with identical elastic pressure. The ropes 65 are both considerably humidified by means of water sprinklers 83 in order to ensure that the humidity condition of both ropes 65 and therewith their coefficient of friction with glass is identical. The ropes 65 driven with high speed are simultaneously cooled by this water.

What I claim is:

1. A bottle conveying/spacing assembly comprising a supply conveyor having a horizontal, upwardly facing bottle conveying first surface upon which the bottoms of sequential bottles rest in relatively crowded, upright positions, a delivery conveyor having a horizontal, upwardly facing bottle conveying second surface upon which the bottoms of sequential bottles are supported in more widely spaced relation than said relatively crowded, upright positions on the first surface, said first and second surfaces being horizontally aligned and defining a gap therebetween, intermediate conveyor means overlapping both the supply conveyor and the delivery conveyor and bridging the gap between the first and second surfaces for transferring the relatively crowded, upright bottles from the first surface to said widely spaced relation on the second surface while gripping such bottles at opposite sides thereof to deposit them in upright positions on the second surface, and drive means for driving the conveying assembly such that said first surface travels at a first linear speed, said second surface travels at a second linear speed much higher than the first linear speed and the intermediate conveyor means accelerates bottles from the first linear speed to deposit bottles on said second surface at said second linear speed, said intermediate conveyor means including horizontally spaced and aligned belts vertically positioned to grip the opposite sides of each bottle generally midway between its top and bottom whereby each upright bottle being transferred is accelerated from said first speed to said second speed while being gripped between its opposite sides to preserve the upright position of each upright bottle despite such acceleration and deposit each bottle in upright position on the second surface.

2. A bottle conveying/spacing assembly as defined in claim 1 wherein the belts of the intermediate conveying means are positioned vertically above said first and second surfaces sufficiently to permit bottles lying horizontally on the first surface to pass beneath the intermediate conveying means and fall downwardly through said gap.

3. A bottle conveying/spacing assembly as defined in claim 2 wherein said belts present opposed bottle-engaging surfaces which are disposed in predetermined horizontally spaced relation so that bottles narrower than said predetermined spacing pass freely between such bottle-engaging surfaces to fall downwardly through said gap.

4. A bottle conveying/spacing assembly as defined in claim 3 wherein each belt is multi-layered including an intermediate layer of resilient, foamed material.

5. A bottle conveying/spacing assembly as defined in claim 4 including means for lubricating said first surface at least in that region thereof overlapped by said intermediate conveyor means.

6. A high speed bottle inspecting assembly comprising the combination of supply conveyor means for transporting glass bottles supported on their bottoms in upright positions and relatively closely spaced with respect to one another at a first linear velocity, delivery conveyor means aligned with and spaced from said supply conveyor means for receiving upright glass bottles from the supply conveyor means in sufficiently spaced positions greater than the spacing of the bottles on the supply conveyor means as to permit high speed sequential inspection thereof and for transporting the upright, spaced glass bottles suported on their bottoms at a second linear velocity which is much greater than said first linear velocity such that bottles supported on their bottoms and subjected to acceleration from the first linear velocity to the second linear velocity would tend to fall over, intermediate conveyor means bridging the space between the supply and delivery conveyor means for gripping opposite sides of each glass bottle to transport it in upright, suspended condition across said space, accelerating the glass bottles from said first linear velocity to said second linear velocity and depositing the glass bottles on their bottoms sequentially in upright positions on the delivery conveyor means in said sufficiently spaced positions, and high speed bottle inspecting means associated with said delivery conveyor means downstream of said intermediate conveyor means for sequentially inspecting said sufficiently spaced upright glass bottles.

7. A bottle inspecting assembly as defined in claim 6 wherein the intermediate conveying means includes horizontally spaced belts which are positioned to the sides of and vertically above said supply and delivery conveyor means sufficiently to permit bottles lying horizontally on the supply conveyor means first surface to pass beneath the intermediate conveying means and fall downwardly through said space between the supply and delivery conveyor means.

8. A bottle inspecting assembly as defined in claim 7 wherein said belts present opposed bottle-engaging surfaces which are disposed in predetermined horizontally spaced relation so that bottles narrower than said pedetermined spacing pass freely between such bottle-engaging surfaces to fall downwardly through said gap.

9. A bottle inspecting assembly as defined in claim 8 wherein each belt is multi-layered including an intermediate layer of resilient, foamed material.

10. A bottle inspecting assembly as defined in claim 18 including means for lubricating said supply conveyor means at least in that region thereof overlapped by said intermediate conveyor means.

11. A bottle conveying/spacing assembly comprising supply conveyor means having a horizontal, upwardly facing bottle conveying first surface upon which the bottoms of sequential bottles rest in upright positions, a delivery conveyor having a horizontal, upwardly facing bottle conveying second surface upon which the bottoms of sequential bottles rest in spaced, upright positions, said first and second surfaces being horizontally aligned and defining a gap therebetween, intermediate conveyor means overlapping both the supply conveyor and the delivery conveyor and bridging the gap between the first and second surfaces for transferring the upright bottles from the first surface to the second surface while gripping such bottles at opposite sides thereof to deposit them in upright positions on the second surface, and drive means for driving the conveying assembly such that said first surface travels at a first linear speed, said second surface travels at a second linear speed and the intermediate conveyor means sequentially accelerates bottles from the first linear speed to deposit bottles on said second surface at said second linear speed, the second linear speed being so much higher than the first linear speed that acceleration of the bottles across said gap would tip a bottom-support bottle over, said intermediate conveyer means including horizontally spaced and aligned belts vertically positioned to grip the opposite sides of each bottle generally midway between its top and bottom whereby each upright bottle being transferred is accelerated from said first speed to said second speed while being gripped between its opposite sides to preserve the upright position of each upright bottle being gripped despite such acceleration and deposit each bottle in upright position on the second surface in at least predetermined spacing from both a preceding and a succeeding bottle.

12. A bottle conveying/spacing assembly as defined in claim 11 wherein the belts of the intermediate conveying means are positioned vertically above said first and second surfaces sufficiently to permit bottles lying horizontally on the first surface to pass beneath the intermediate conveying means and fall downwardly through said gap.

13. A bottle conveying/spacing assembly as defined in claim 12 wherein said belts present opposed bottle-engaging surfaces which are disposed in predetermined horizontally spaced relation so that bottles narrower than said predetermined spacing pass freely between such bottle-engaging surfaces to fall downwardly through said gap.

14. A bottle conveying/spacing assembly as defined in claim 13 wherein each belt is multi-layered including an intermediate layer of resilient, foamed material.

15. A bottle conveying/spacing assembly as defined in claim 14 including means for lubricating said first surface at least in that region thereof overlapped by said intermediate conveyor means.

16. A bottle conveying/spacing assembly as defined in claim 15 wherein the bottle-engaging surfaces of said belts are formed of material such as natural rubber having a high coefficient of friction with respect to the material of the bottles.

17. A bottle conveying/spacing assembly as defined in claim 16 including guide means for guiding said belts, and means for lubricating said guide means with water.

* * * * *